(12) United States Patent
Sugino

(10) Patent No.: US 10,253,573 B2
(45) Date of Patent: Apr. 9, 2019

(54) THREADED JOINT FOR STEEL PIPES

(71) Applicants: NIPPON STEEL & SUMITOMO METAL CORPORATION, Tokyo (JP); VALLOUREC OIL AND GAS FRANCE, Aulnoye-Aymeries (FR)

(72) Inventor: Masaaki Sugino, Nishinomiya (JP)

(73) Assignees: NIPPON STEEL & SUMITOMO METAL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 165 days.

(21) Appl. No.: 15/037,354

(22) PCT Filed: Dec. 5, 2014

(86) PCT No.: PCT/JP2014/006079
§ 371 (c)(1),
(2) Date: May 18, 2016

(87) PCT Pub. No.: WO2015/083382
PCT Pub. Date: Jun. 11, 2015

(65) Prior Publication Data
US 2016/0281440 A1     Sep. 29, 2016

(30) Foreign Application Priority Data
Dec. 5, 2013 (JP) ................ 2013-251671

(51) Int. Cl.
*E21B 17/042* (2006.01)
*F16L 15/06* (2006.01)

(52) U.S. Cl.
CPC ............ *E21B 17/042* (2013.01); *F16L 15/06* (2013.01)

(58) Field of Classification Search
CPC ....... F16L 15/06; F16L 15/001; F16L 15/006; E21B 17/42
USPC .................................... 285/333, 334
See application file for complete search history.

(56) References Cited

U.S. PATENT DOCUMENTS 4,692,988 A      9/1987   Shulver et al.
5,360,240 A  *  11/1994   Mott ............................ 285/334
6,158,785 A  *  12/2000   Beaulier ............... E21B 17/042
                                                                285/334

(Continued)

FOREIGN PATENT DOCUMENTS

JP            04-83988         3/1992
JP            06-281061        10/1994

(Continued)

*Primary Examiner* — Greg Binda
*Assistant Examiner* — Zachary T Dragicevich
(74) *Attorney, Agent, or Firm* — Clark & Brody

(57) ABSTRACT

A threaded joint is constructed of a pin and a box. The pin includes a shoulder surface, a seal surface, and a male threaded portion. The box includes a shoulder surface, a seal surface, and a female threaded portion. The male threaded portion and the female threaded portion are each a tapered threaded portion including threads having a trapezoidal profile. The male threaded portion has a width of the threads that gradually decreases along the thread helix and a width of grooves that gradually increases along the thread helix. The female threaded portion has a width of grooves that gradually decreases along the thread helix and a width of the threads that gradually increases along the thread helix.

4 Claims, 8 Drawing Sheets

(56) References Cited

U.S. PATENT DOCUMENTS

| | | | |
|---|---|---|---|
| 2002/0074799 A1 | 6/2002 | Watts | |
| 2003/0168859 A1 | 9/2003 | Watts | |
| 2008/0054633 A1* | 3/2008 | Reynolds | F16L 15/06 285/334 |
| 2011/0278838 A1* | 11/2011 | Martin | E21B 17/042 285/333 |
| 2012/0068458 A1* | 3/2012 | Granger | E21B 17/042 285/334 |

FOREIGN PATENT DOCUMENTS

| | | |
|---|---|---|
| JP | 07-100773 | 4/1995 |
| JP | 09-119564 | 5/1997 |
| JP | 09-273671 | 10/1997 |
| JP | 10-89554 | 4/1998 |
| WO | 99/08034 | 2/1999 |
| WO | 2013/108931 | 7/2013 |

* cited by examiner

THREADED JOINT FOR STEEL PIPES

TECHNICAL FIELD

The present invention relates to a threaded joint for use in connecting steel pipes.

BACKGROUND ART

In oil wells, natural gas wells, and the like (hereinafter also collectively referred to as "oil wells"), oil country tubular goods are used for extraction of underground resources. Oil country tubular goods, which are steel pipes, are configured to be sequentially connected to each other, and threaded joints are used for the connection (see Japanese Patent Application Publication No. H09-119564 (Patent Literature 1), Japanese Patent Application Publication No. H10-89554 (Patent Literature 2), and Japanese Patent Application Publication No. H09-273671 (Patent Literature 3)).

Such threaded joints for steel pipes are generally classified into two types, a coupling type and an integral type. In the case of a coupling type, one of a pair of tubular goods that are to be connected to each other is a steel pipe, whereas the other thereof is a coupling. In this case, the steel pipe is provided with a male threaded portion formed on the outer circumference at each end thereof, and the coupling is provided with a female threaded portion formed on the inner circumference at each end thereof. The male threaded portion of the steel pipe is screwed into the female threaded portion of the coupling, thereby making up a joint and connecting them. In the case of an integral type, a pair of tubular goods that are to be connected to each other are both steel pipes, and no separate coupling is used. In this case, each steel pipe is provided with a male threaded portion formed on the outer circumference at one end thereof and a female threaded portion formed on the inner circumference at the other end thereof. The male threaded portion of one of the steel pipes is screwed into the female threaded portion of the other of the steel pipes, thereby making up a joint and connecting them.

In general, the joint portion at the pipe end portion where a male threaded portion is formed is referred to as a pin because it includes an element that is inserted into a female threaded portion. On the other hand, the joint portion at the pipe end portion where a female threaded portion is formed is referred to as a box because it includes an element that receives a male threaded portion. A pin and a box both have a tubular shape because they are constituted by end portions of tubular goods.

As threaded joints for steel pipes, threaded joints with tapered threads as specified by API (American Petroleum Institute) standards are generally used. Also, as disclosed for example in Patent Literature 1, threaded joints with modified API buttress threads (trapezoidal threads) and having improved torque resistance capability are used. The torque resistance capability refers to the ability to prevent deformation, fracture, or the like even when excessive torque is applied to threads in a made-up state.

The threaded portions of the threaded joint disclosed in Patent Literature 1 include tapered threads having a generally trapezoidal thread form. Of the two side surfaces of each thread of the threaded portions, the side surface located at the trailing side in the direction in which the male threaded portion is screwed during make-up is referred to as a load flank. The side surface located at the leading side in the direction in which the male threaded portion is screwed during make-up is referred to as a stabbing flank. The load flanks of Patent Literature 1 have an angle (load flank angle) with respect to a plane perpendicular to the thread axis (hereinafter also referred to as a "joint axis" or "pipe axis") which is in the range of −20 degrees to less than 0 degrees. The load flank angle, if expressed in terms of an angle formed by the load flank with respect to the pipe axis in the screwing direction, is in the range of greater than 90 degrees to 110 degrees. The stabbing flanks of Patent Literature 1 have an angle (stabbing flank angle) with respect to a plane perpendicular to the pipe axis which is in the range of greater than 30 degrees to 60 degrees. The stabbing flank angle, if expressed in terms of an angle formed by the stabbing flank with respect to the pipe axis in the screwing direction, is in the range of greater than 120 degrees to 150 degrees.

The stabbing flanks of Patent Literature 1 are provided with an interference fit. In the threaded portions of Patent Literature 1, in a made-up state, the load flanks of the male threaded portion and those of the female threaded portion are in contact with each other, and the stabbing flanks of the two portions are in contact with each other. In this state, crests and roots of the two portions are not in contact with each other, and clearances are formed therebetween. Such a threaded joint of Patent Literature 1 has high torque resistance capability by virtue of a wedge effect produced by the contact between the load flanks and between the stabbing flanks.

The pin of Patent Literature 1 is provided with an abutment surface, called a shoulder surface, located at the leading end thereof. The box is provided with a shoulder surface that corresponds to the shoulder surface of the pin. In make-up of the pin with the box, the shoulder surface of the pin is abutted against the shoulder surface of the box, so that they are brought into contact with each other. Upon abutment of the shoulder surfaces, the tightening torque which is required for screwing of the pin increases rapidly. This phenomenon, in which shoulder surfaces are abutted against each other, is referred to as shouldering, and the tightening torque that is generated at the moment of shouldering is referred to as shouldering torque.

If the screwing of the pin is excessively performed after shouldering, yielding (plastic deformation) occurs in the regions of the shoulder surfaces, so that the tightening torque no longer increases or rapidly decreases. This phenomenon and the tightening torque that is generated at the moment when this phenomenon occurs are referred to as overtorque.

If make-up can be completed with a tightening torque that is in a range between shouldering and overtorque, the threaded joint will exhibit the best performance. That is, a suitable axial tightening force is generated within the threaded joint, so that the threaded portions are brought into firm engagement so as not to be loosened easily. In addition, in many cases, threaded joints are provided with seal portions which are mated together and placed in intimate contact around the entire circumference in a state in which the pin and the box have been made up. In this case, the seal portions form an interference fit therebetween as designed, as long as the make-up has been completed with a tightening torque in a range between the shouldering and the overtorque, and therefore desired sealing ability is achieved. Thus, when performing a make-up operation, a target tightening torque value is predetermined to assess the completion of the make-up. Such a target torque is set to a value between the shouldering torque and the overtorque.

If, for some reason, the tightening torque increases abnormally to greater than the target torque before shouldering actually occurs, the make-up operation will terminate in a state of insufficient tightening so to speak, and therefore a sufficient axial tightening force will not be introduced. In such a case, there is a possibility that the engagement of the threaded portions may become loose and thus a predetermined strength may not be obtained or that the contact force at the seal portions may be insufficient and thus a predetermined sealing ability may not be obtained. This phenomenon is referred to as high shouldering (a problem of shouldering torque becoming higher than a target torque).

On the other hand, if the tightening torque increases to greater than the overtorque, the state of excessive tightening so to speak will occur, which will cause plastic deformation in the regions of the shoulder surfaces. If this occurs, in the case where the seal portions are provided adjacent to the shoulder surfaces, the deformation of the regions of the shoulder surfaces is likely to lead to deformation of the seal portions and therefore formation of gaps therebetween, which results in a significant decrease in sealing ability.

As described above, the threaded joint of Patent Literature 1 is configured such that, in a made-up state, the load flanks of the threaded portions are in contact with each other and the stabbing flanks thereof are in contact with each other, and thus there are no clearances between the load flanks or between the stabbing flanks. Therefore, even when a high tensile load or compressive load is applied to the threaded joint in the axial direction, it is not likely that the pin and the box are relatively displaced in the axial direction. In particular, when a compressive load is applied to the threaded joint, the stabbing flanks of the threaded portions bear most of the compressive load, and therefore the deformation of the regions of the shoulder surfaces is inhibited and thus the deformation of the seal portions is also inhibited. As a result, the threaded joint of Patent Literature 1 has a sealing ability higher than that of threaded joints that employ API buttress threads.

CITATION LIST

Patent Literature

Patent Literature 1: Japanese Patent Application Publication No. H09-119564
Patent Literature 2: Japanese Patent Application Publication No. H10-89554
Patent Literature 3: Japanese Patent Application Publication No. H09-273671

SUMMARY OF INVENTION

Technical Problem

In the case of the threaded joint of Patent Literature 1, by the load flanks that are in contact with each other and the stabbing flanks that are in contact with each other, a wedge effect is produced, whereas the crests and roots are not in contact with each other. In the threaded joint of Patent Literature 1, over a long period of time in the course of screwing the pin, the rotation proceeds with the load flanks contacting each other and the stabbing flanks contacting each other, both at very high pressure, and this leads to an increased probability of galling.

Moreover, the threaded joint of Patent Literature 1 is very susceptible to influence of dimensional error of the thread teeth width and the groove width. Specifically, even very slight dimensional error results in a large change in the tightening torque. Thus, there is a possibility that, when the tightening torque has reached a target torque in the make-up operation, what is actually occurring is high shouldering. In order to avoid such a problem, if the dimensional tolerances of the thread width and the groove width are reduced, then the efficiency of thread machining will be significantly decreased.

An object of the present invention is to provide a threaded joint for steel pipes having the following characteristics:
Improved torque resistance capability with high sealing ability being maintained;
In make-up, inhibition of galling and inhibition of high shouldering; and
Ease of manufacturing.

Solution to Problem

A threaded joint for steel pipes according to an embodiment of the present invention includes a tubular pin and a tubular box, the pin and the box being made up by screwing the pin onto the box.

The pin includes a shoulder surface, a seal surface, and a male threaded portion.

The box includes a shoulder surface, a seal surface, and a female threaded portion, corresponding to the shoulder surface of the pin, the seal surface thereof, and the male threaded portion thereof, respectively.

The male threaded portion and the female threaded portion are each a tapered threaded portion including threads having a trapezoidal profile, each thread of the male threaded portion and the female threaded portion having a profile width that is larger at a base side than at a crest side.

The male threaded portion has a thread width that gradually decreases along a thread helix thereof and a groove width that gradually increases along the thread helix, in a direction in which the male threaded portion is screwed; and the female threaded portion has a groove width that gradually decreases along a thread helix thereof and a thread width that gradually increases along the thread helix, in the direction in which the male threaded portion is screwed.

In a made-up state, the shoulder surfaces are in contact with each other, the seal surfaces are in contact with each other, load flanks of the male threaded portion are in contact with load flanks of the female threaded portion, stabbing flanks of the male threaded portion are in contact with stabbing flanks of the female threaded portion, roots of the male threaded portion are in contact with crests of the female threaded portion, and clearances are provided between crests of the male threaded portion and roots of the female threaded portion.

Advantageous Effects of Invention

A threaded joint for steel pipes of the present invention has the following significant advantages:
Improved torque resistance capability can be achieved while high sealing ability is maintained;
In make-up, galling can be inhibited and high shouldering can be inhibited; and
Ease of manufacturing can be achieved.

DESCRIPTION OF EMBODIMENTS

Figure 1:
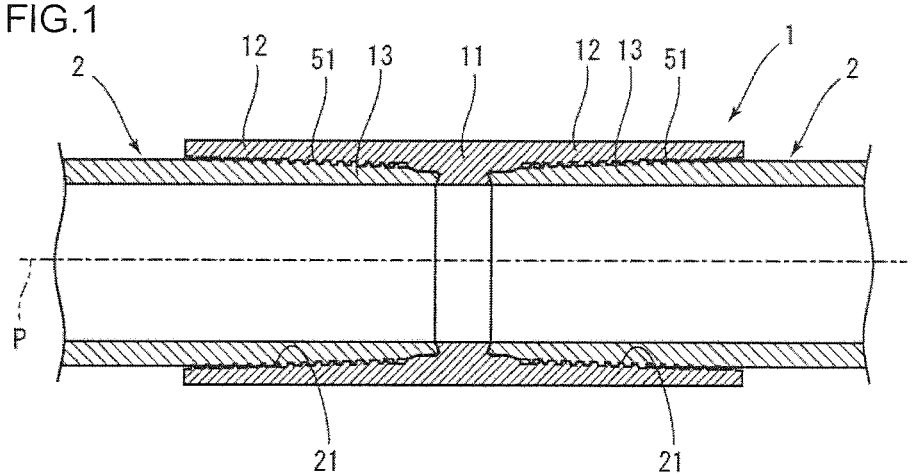
FIG. 1 is a longitudinal sectional view showing the overall configuration of a threaded joint for steel pipes according to an embodiment of the present invention.

In order to achieve the above object, the present inventors carried out intensive studies and have made the following findings. The occurrence of galling and high shouldering in the threaded joint for steel pipes of Patent Literature 1 is attributable to the fact that, over a long period of time in the course of screwing the pin, the rotation proceeds with the load flanks contacting each other and the stabbing flanks contacting each other, both at high pressure. Therefore, in the make-up, if it is possible to reduce the rotation (distance) involving the contact between the load flanks and between the stabbing flanks, then it will be possible to inhibit the occurrence of galling and, as a result, it will be possible to inhibit the occurrence of high shouldering. Further, by allowing the contact between the load flanks and between the stabbing flanks to occur immediately before the completion of the make-up, a wedge effect is produced to make it possible to achieve improved torque resistance capability and sealing ability, in addition to the reduced risk of galling and high shouldering.

The threaded joint for steel pipes of the present invention has been made based on the above findings. Embodiments of the threaded joint for steel pipes according to the present invention are described below.

A threaded joint for steel pipes according to the present embodiment is constructed of a tubular pin and a tubular box, wherein make-up between the pin and the box is accomplished by screwing the pin onto the box. The pin includes a shoulder surface, a seal surface, and a male threaded portion. The box includes a shoulder surface, a seal surface, and a female threaded portion, corresponding to the shoulder surface of the pin, the seal surface thereof, and the male threaded portion thereof, respectively. The male threaded portion and the female threaded portion are each a tapered threaded portion including threads having a trapezoidal profile, each thread of the male threaded portion and the female threaded portion having a profile width that is larger at a base side than at a crest side. The male threaded portion has a thread width that gradually decreases along the thread helix and a groove width that gradually increases along the thread helix, in a direction in which the male threaded portion is screwed; and the female threaded portion has a groove width that gradually decreases along the thread helix and a thread width that gradually increases along the thread helix, in the direction in which the male threaded portion is screwed. In a made-up state, the shoulder surfaces are in contact with each other, the seal surfaces are in contact with each other, load flanks of the male threaded portion are in contact with load flanks of the female threaded portion, stabbing flanks of the male threaded portion are in contact with stabbing flanks of the female threaded portion, roots of the male threaded portion are in contact with crests of the female threaded portion, and clearances are provided between crests of the male threaded portion and roots of the female threaded portion.

When the above configuration for the shapes of the male threaded portion and the female threaded portion, particularly for the thread teeth widths and the groove widths, is employed, hard contact does not occur between the load flanks of the threaded portions and between the stabbing flanks thereof during the course of screwing the pin onto the box, but instead hard contact between them occurs immediately before the completion of the make-up. When the load flanks come into hard contact with each other and the stabbing flanks come into hard contact with each other, a wedge effect is produced by this contact and thereby torque resistance (rotational resistance) increases. Thus, the amount of torque required to cause plastic deformation in the regions of the shoulder surfaces increases. As a result, it is possible to improve the torque resistance capability of the threaded joint for steel pipes.

Furthermore, the roots of the male threaded portion and the crests of the female threaded portion are in contact with each other in a made-up state. That is, the roots of the male threaded portion and the crests of the female threaded portion are provided with an interference fit. Because of this, in the course of screwing the pin, before the seal surfaces of the pin and the box are brought into contact and start sliding against each other, the roots of the male threaded portion and the crests of the female threaded portion come into contact with each other. With this, the pin and the box are placed in a coaxial relationship with each other, which allows the pin and the box to rotate in stable positions and also allows the seal surfaces to begin contacting each other in stable positions. As a result, it is possible to inhibit galling and damage due to partial contact between the seal surfaces.

Furthermore, as described above, between the load flanks and between the stabbing flanks, high pressure is not exerted until immediately before the completion of the make-up, but high pressure begins to act just immediately before the completion of the make-up. Thus, the rotation (distance) involving the contact between the load flanks and between the stabbing flanks is reduced. As a result, it is possible to prevent the occurrence of galling at the threaded portions. It is to be noted that, when hard contact occurs between the load flanks and between the stabbing flanks, a wedge effect is produced and thereby the tightening torque rapidly increases. This phenomenon is referred to as locking.

Furthermore, by employing the above configuration for the shapes of the male threaded portion and the female threaded portion, particularly for the thread teeth widths and the groove widths, it is possible to ensure that the tightening torque is maintained to be low at the time of shouldering (or locking) immediately before the completion of the make-up. Thus, it is possible to prevent the occurrence of high shouldering. Moreover, stringent dimensional tolerances are not required for the thread teeth widths and the groove widths in manufacturing, and therefore the efficiency of thread machining will be improved.

Furthermore, each thread of the male threaded portion and the female threaded portion has a profile width that is larger at a base side than at a crest side. Such threaded portions of the present embodiment are easy to fabricate compared to those having a dovetail profile or an inverted trapezoidal profile. When machining dovetail threads, a tool to be used therefor is of a type having cutting edges that are wider at their tips and narrower at their roots, and thus can be easily broken. On the other hand, in thread machining of the threaded portions of the present embodiment, a robust tool having cutting edges that are wider at their roots than at their tips can be used. Thus, the efficiency of thread machining is improved and therefore ease of threaded joint manufacturing can be achieved.

Preferably, in the above threaded joint, the stabbing flanks of the male threaded portion form an angle $\alpha$ with respect to a pipe axis in the screwing direction and the load flanks of the male threaded portion form an angle $\beta$ with respect to the pipe axis in the screwing direction, wherein the angle $\alpha$ and the angle $\beta$ are each 90 degrees or more, and the condition $\alpha > \beta$ is satisfied. When such size and shape is employed for the threaded portions, increased ease of threaded joint manufacturing can be achieved. Moreover, as long as the angle $\beta$ of the load flanks is within the above range, it is possible to prevent the occurrence of jump-out. Jump-out refers to a failure such that pin threads come off over the box threads and become disengaged when a high tensile load is applied to a threaded joint.

As described above, upon locking of the pin and the box, a wedge effect is produced in the male threaded portion and the female threaded portion. When shouldering occurs in addition to this, the amount of torque required to cause plastic deformation in the regions of the shoulder surfaces greatly increases. Consequently, the torque resistance capability of the threaded joint for steel pipes is significantly improved. That is, with the torque resistance due to shouldering being combined with the torque resistance due to locking, the torque resistance capability of the threaded joint for steel pipes is significantly improved.

Preferably, in the above threaded joint, the shoulder surfaces are configured so that, in the make-up of the threaded joint, a state in which the load flanks contact each other and the stabbing flanks also contact each other occurs when an amount of screwing rotation of the pin with respect to the box is within a predetermined range, based on a time at which the shoulder surfaces are brought into contact with each other. This configuration advantageously produces the combined effect of the torque resistance due to shouldering and the torque resistance due to locking.

Preferably, in the above threaded joint, the seal surface of the pin is disposed between the male threaded portion of the pin and the shoulder surface thereof. In this case, the seal surface of the box is disposed between the female threaded portion of the box and the shoulder surface thereof. The seal surfaces have an interference fit therebetween. By means of such seal portions, it is possible to prevent fluids passing within the threaded joint from leaking to the outside or fluids outside the threaded joint from entering into the threaded joint. With this configuration, deformation of the regions of the shoulder surfaces is inhibited even when a high compressive load is applied to the threaded joint because not only the shoulder surfaces but also the stabbing flanks of the threaded portions bear the compressive load, and as a result the sealing ability of the seal portions is stably ensured.

Preferably, in the above threaded joint, the shoulder surface is disposed at an end of the pin, and the pin has, between the seal surface and the shoulder surface, a nose portion which does not come into contact with the box. With this configuration, deformation of the nose portion itself as well as the regions of the shoulder surfaces is inhibited even when a high compressive load is applied to the threaded joint because the nose portion serves as a buffer portion. Thus, the sealing ability of the seal portions is ensured more stably.

Hereinafter, the threaded joint for steel pipes of the present embodiment will be described in detail with reference to the drawings.

[Configuration of Threaded Joint]

FIG. 1 is a longitudinal sectional view showing the overall configuration of a threaded joint for steel pipes according to an embodiment of the present invention. The threaded joint of the present embodiment is a coupling-type threaded joint configured to connect a pair of steel pipes 2 by a coupling 11.

The coupling 11 is a cylindrical short pipe which extends along a pipe axis P. Opposite end portions, in the pipe axis P direction, of the coupling 11 constitute boxes 12. Opposite end portions of each of the paired steel pipes 2 constitute pins 13. The box 12 is provided with a female threaded portion 21 on its inner circumference. Each pin 13 is provided with a male threaded portion 51 on its outer circumference. The box 12 and the pin portion 13 are made up with each other by screwing the male threaded portion 51 of the pin 13 into the female threaded portion 21 of the box 12. Thus, a threaded joint 1 constructed of the pair of steel pipes 2 and the coupling 11 is formed.

The threaded joint 1 of the present embodiment is utilized to connect steel pipes 2 which are used in oil wells for extracting underground resources such as petroleum and natural gas, producing them, or using them, and also wells for hot springs or geothermal power generation, and further wells for underground containment of waste such as $CO_2$, and the like. In addition, the threaded joint 1 of the present embodiment is utilized to connect steel pipes 2 which are used to transport methane hydrate, rare metals, and the like from the sea bed to an offshore platform. This threaded joint 1 is capable of being quickly made up or broken out.

Figure 2:
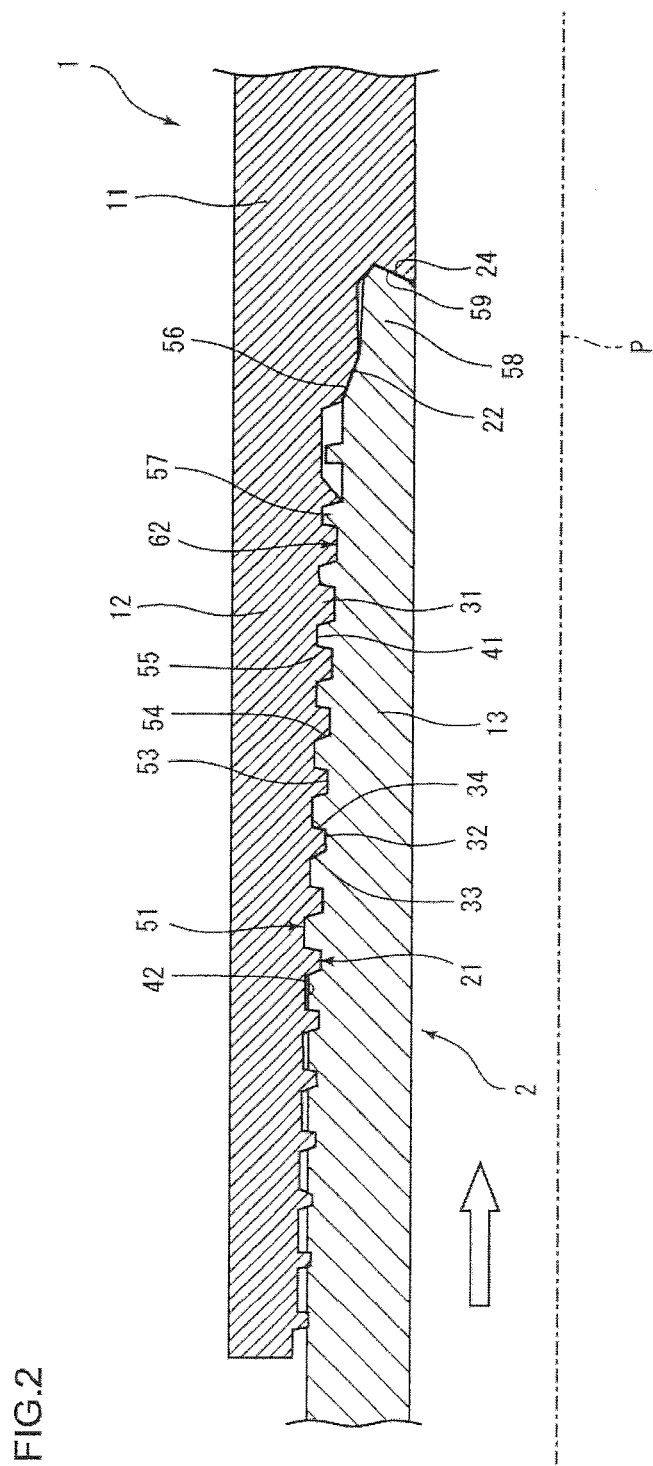
FIG. 2 is an enlarged longitudinal sectional view of the joint portion of the threaded joint for steel pipes shown in FIG. 1.

FIG. 2 is an enlarged longitudinal sectional view of the joint portion of the threaded joint for steel pipes shown in FIG. 1. The pin 13 includes a nose portion 58 including a shoulder surface 59, a seal surface 56, and a male threaded portion 51, arranged in the order from the end toward the body of the pipe. The box 12 includes a shoulder surface 24, a seal surface 22, and a female threaded portion 21 arranged in the order from the body of the pipe toward the end. The shoulder surface 24, the seal surface 22, and the female threaded portion 21 of the box 12 are provided corresponding to the shoulder surface 59, the seal surface 56, and the male threaded portion 51 of the pin 13, respectively.

Figure 3:
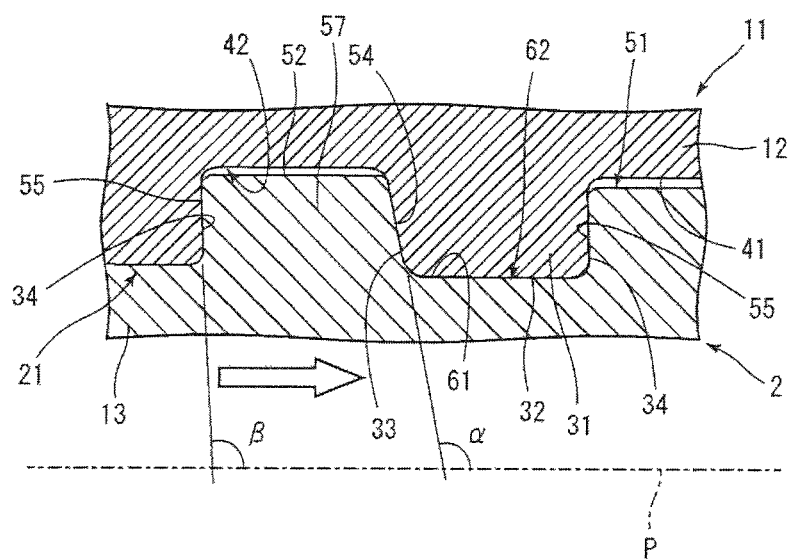
FIG. 3 is an enlarged longitudinal sectional view of a part of threaded portions of the threaded joint for steel pipes shown in FIG. 1.

FIG. 3 is an enlarged longitudinal sectional view of a part of the threaded portions of the threaded joint for steel pipes shown in FIG. 1. The male threaded portion 51 of the pin 13 has threads 57 having a trapezoidal profile and grooves 62 formed between the threads 57. The threads 57 of the male threaded portion 51 are helically formed on the outer circumferential surface of the pin 13. Thus, the grooves 62 of the male threaded portion 51 are also helically formed on the outer circumferential surface of the pin 13. The bottom surfaces of the grooves 62 constitute roots 61 of the male threaded portion 51.

As with the male threaded portion 51 of the pin 13, the female threaded portion 21 of the box 12 has threads 31 having a trapezoidal profile in the longitudinal section and grooves 42 formed between the threads 31. The threads 31 of the female threaded portion 21 are helically formed on the inner circumferential surface of the box 12. Thus, the grooves 42 of the female threaded portion 21 are also helically formed. The bottom surfaces of the grooves 42 constitute roots 41 of the female threaded portion 21.

The male threaded portion 51 of the pin 13 and the female threaded portion 21 of the box 12 are tapered threads that mate with each other. The threads 57 of the male threaded portion 51 threadedly engage with the grooves 42 of the female threaded portion 21. The grooves 62 of the male threaded portion 51 threadedly engage with the threads 31 of the female threaded portion 21. With the configurations of the male threaded portion 51 and the female threaded portion 21 as described above, in make-up of the pin 13 and the box 12, the pin 13 moves relatively in the direction of the pipe axis P while rotating with respect to the box 12.

In the description below, it is assumed that, for make-up of the pin 13 of the steel pipe 2 with the box 12 of the coupling 11, the pin 13 moves with respect to the box 12 in the course of screwing the pin 13. In FIGS. 2 and 3, it is assumed that the direction in which the pin 13 moves with respect to the box 12, i.e., the direction in which the male threaded portion 51 of the pin 13 is screwed is the right direction (see the outlined arrow in FIGS. 2 and 3).

As shown in FIG. 3, the threads 57 of the male threaded portion 51 each have a crest 52 located radially outward of the pin 13, a stabbing flank 54 located at a leading side in the direction in which the male threaded portion 51 is screwed, and a load flank 55 located at a trailing side in the direction in which the male threaded portion 51 is screwed. The bottom surfaces of the grooves 62 located between the threads 57 each constitute a root 61 of the male threaded portion 51.

The threads 31 of the female threaded portion 21 each have a crest 32 located radially inward of the box 12, a stabbing flank 33 located at a trailing side in the direction in which the male threaded portion 51 is screwed, and a load flank 34 located at a leading side in the direction in which the male threaded portion 51 is screwed. The bottom surfaces of the grooves 42 located between the threads 31 each constitute a root 41 of the female threaded portion 21. In a made-up state, the stabbing flanks 33 of the female threaded portion 21 are in contact with the stabbing flanks 54 of the male threaded portion 51, and the load flanks 34 of the female threaded portion 21 are in contact with the load flanks 55 of the male threaded portion 51.

The roots 61 of the male threaded portion 51 and the crests 32 of the female threaded portion 21 are configured to have an interference fit in the radial direction of the pin 13 and the box 12. Because of this, in the course of screwing the pin 13, the roots 61 of the male threaded portion 51 and the crests 32 of the female threaded portion 21 begin contacting each other before the seal surface 22 of the box 12 and the seal surface 56 of the pin 13 begin contacting each other as described later.

As shown in FIG. 2, in the female threaded portion 21, the distance between the threads 31, i.e., the width of the grooves 42 gradually decreases along the thread helix, whereas the width of the threads 31 gradually increases along the thread helix, in the direction in which the male threaded portion 51 is screwed.

As used herein, the width of the grooves 42 of the female threaded portion 21 refers to the width of the roots 41, and the width of the threads 31 thereof refers to the width of the crests 32. The width of the roots 41 refers to a width which would be obtained when the roots 41 are projected onto the axis of the threaded joint 1, and the width of the crests 32 refers to a width which would be obtained when the crests 32 are projected onto the axis of the threaded joint 1. That is, the width of the roots 41 refers to a distance between a pair of vertical lines drawn downward from opposite ends of each root 41 to the axis of the threaded joint 1. The width of the crests 32 refers to a distance between a pair of vertical lines drawn downward from opposite ends of each crest 32 to the axis of the threaded joint 1. As used herein, opposite ends of the roots 41 refers to intersection points between an extension of each root 41 and an extension of each load flank 34 and between an extension of each root 41 and an extension of each stabbing flank 33. Likewise, opposite ends of the crests 32 refers to intersection points between an extension of each crest 32 and an extension of each load flank 34 and between an extension of each crest 32 and an extension of each stabbing flank 33.

Furthermore, in the male threaded portion 51, the distance between the threads 57, i.e., the width of the grooves 62 gradually increases along the thread helix, whereas the width of the threads 57 gradually decreases along the thread helix, in the direction in which the male threaded portion 51 is screwed.

As used herein, the width of the grooves 62 of the male threaded portion 51 refers to the width of the roots 61, and the width of the threads 57 thereof refers to the width of the crests 52. As with the female threaded portion 21 described above, the width of the roots 61 refers to a width which would be obtained when the roots 61 are projected onto the axis of the threaded joint 1, and the width of the crests 52 refers to a width which would be obtained when the crests 52 are projected onto the axis of the threaded joint 1.

Typically, the coupling 11 and the steel pipes 2 described above, when used in oil wells for example, are made up with each other in the following manner. At a rig site of an oil well, a platform and derrick is placed over the hole of the well, and make-up of the pin 13 with the box 12 is performed there. The box 12 (coupling 11) having the female threaded portion 21 is secured to the platform. The box 12, i.e., the coupling 11, has been connected to a steel pipe 2 which has already been installed vertically downward as an oil well pipe. A steel pipe 2 as the pin 13 having the male threaded portion 51 is lifted upwardly by a crane, an elevator, or the like over the box 12 held on the platform. The steel pipe 2 is lowered in an orientation such that the pipe axis P extends vertically and inserted into the box 12. Then the pin 13 is screwed onto the box 12 by a dedicated make-up machine referred to as a power tong, so that they are made up.

Figure 4A:
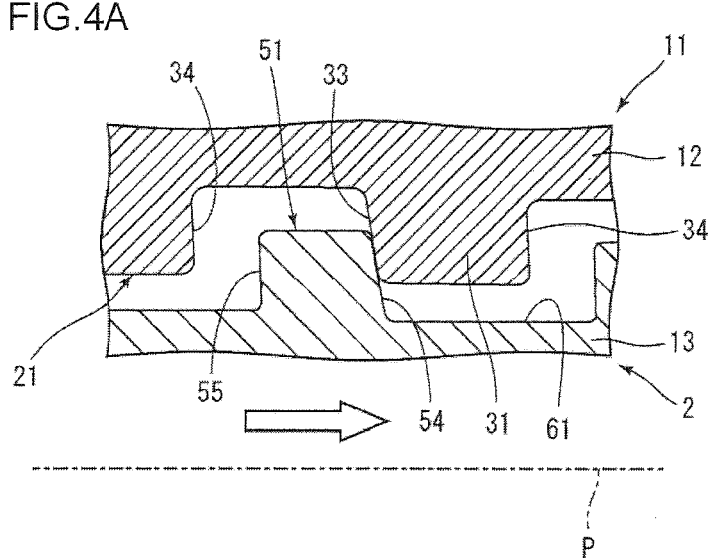
FIG. 4A is a schematic illustration showing how make-up between the pin and the box proceeds, in which an early stage of screwing of the pin is shown.
Figure 4B:
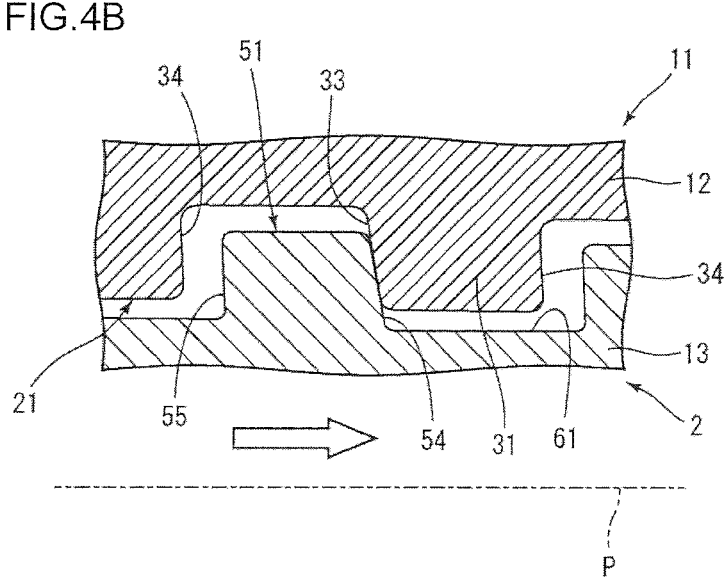
FIG. 4B is a schematic illustration showing how make-up between the pin and the box proceeds, in which an intermediate stage of the screwing of the pin is shown.
Figure 4C:
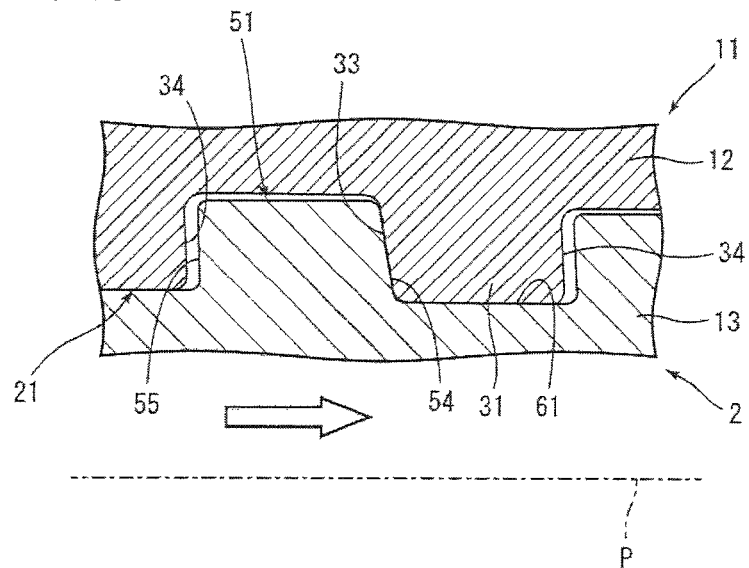
FIG. 4C is a schematic illustration showing how make-up between the pin and the box proceeds, in which a final stage of the screwing of the pin is shown.
Figure 4D:
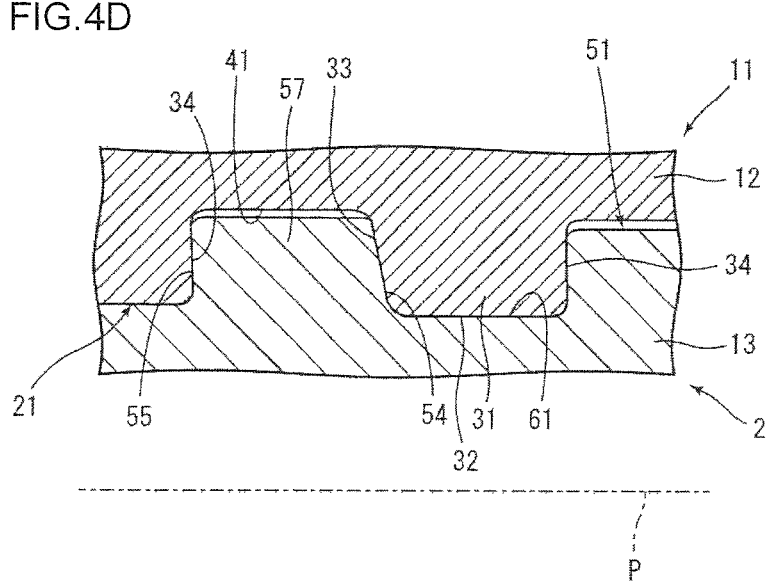
FIG. 4D is a schematic illustration showing how make-up between the pin and the box proceeds, in which a state at the completion of the make-up is shown.

FIGS. 4A to 4D are schematic illustrations showing how make-up between the pin and the box proceeds. FIGS. 4A to 4D are each an enlarged longitudinal sectional view of a part of the threaded portions of the threaded joint for steel pipes shown in FIG. 1. FIG. 4A shows an early stage of screwing of the pin. FIG. 4B shows an intermediate stage of the screwing of the pin. FIG. 4C shows a final stage of the screwing of the pin. FIG. 4D shows a state at the completion of the make-up.

As shown in FIGS. 4A to 4D, during the screwing of the pin 13 onto the box 12, the stabbing flanks 33 of the box 12 and the stabbing flanks 54 of the pin 13 contact each other, for most part of the process before the make-up is completed. This is because the weight of the pin 13 itself (steel pipe 2) acts on the pin 13. In FIGS. 4A to 4C, the direction in which the pin 13 (pipe 2) is screwed is indicated by an outlined arrow.

As described above, the width of the threads 57 of the male threaded portion 51 (pin 13) is configured to gradually decrease along the thread helix. The width of the grooves 42 of the female threaded portion 21 (box 12) is also configured to gradually decrease along the female thread helix. Thus, as shown in FIGS. 4A to 4C, the clearance between the female threaded portion 21 and the male threaded portion 51 gradually decreases while the pin 13 is being threadedly engaged with the box 12.

Furthermore, as described above, the roots 61 of the male threaded portion 51 and the crests 32 of the female threaded portion 21 are configured to have an interference fit therebetween. Thus, as shown in FIG. 4C, the roots 61 of the male threaded portion 51 and the crests 32 of the female threaded portion 21 begin contacting each other before the load flanks 34 of the female threaded portion 21 and the load flanks 55 of the male threaded portion 51 begin contacting each other, in the course of screwing the pin 13 onto the box 12. With this, the pin 13 and the box 12 are placed in a coaxial relationship with each other. Then, as shown in FIG. 4D, the roots 61 of the male threaded portion 51 and the crests 32 of the female threaded portion 21 will have been pressed tightly against each other by the time the make-up is completed. Because of the interference fit between the roots 61 of the male threaded portion 51 and the crests 32 of the female threaded portion 21, mating pressure that is exerted between the roots 61 and the crests 32 gradually increases with the screwing rotation of the pin 13.

Furthermore, as shown in FIG. 4D, the load flanks 34 of the female threaded portion 21 and the load flanks 55 of the male threaded portion 51 come into contact with each other. When this occurs, the shoulder surface 59 of the pin 13 is in contact with the shoulder surface 24 of the box 12 although not shown. The load flanks 34 and 55 come into contact with each other in such a manner that a predetermined load is applied thereto because they receive the reaction force generated by the contact between the stabbing flanks 33 and 54 and further part of the reaction force generated when the shoulder surfaces 59 and 24 are brought into contact with each other, i.e. thread tightening axial force. Thus, by the contact between the shoulder surfaces 59 and 24, positioning of the pin 13 with respect to the box 12 is made possible, and also the torque resistance capability of the threaded joint 1 can be improved.

Moreover, as described below, the shoulder surface 59 of the pin 13 and the shoulder surface 24 of the box 12 are configured so that shouldering, which is the contacting between the shoulder surfaces 59 and 24, and the locking, in which a wedge effect is produced by the contact between the load flanks 55 and 34 and the contact between the stabbing flanks 54 and 33, occur substantially simultaneously. Because of this, the torque resistance capability of the threaded joint 1 can be further improved.

In a state where the pin 13 and the box 12 have been made up, the male threaded portion 51 and the female threaded portion 21 are in a condition such that the load flanks 55 and 34 are in contact with each other, the stabbing flanks 54 and 33 are in contact with each other, and the roots 61 of the male threaded portion 51 and the crests 32 of the female threaded portion 21 are in contact with each other, as shown in FIG. 4D. However, between the crests 52 of the male threaded portion 51 and the roots 41 of the female threaded portion 21, there are provided clearances.

As shown in FIG. 3, the stabbing flanks 54 and the load flanks 55 of the male threaded portion 51 are configured so that the angles formed by them with respect to the pipe axis P in the direction in which the male threaded portion 51 is screwed are 90 degrees or more. Specifically, the angle α formed by the stabbing flanks 54 with respect to the pipe axis P in the direction in which the male threaded portion 51 is screwed, and the angle β formed by the load flanks 55 with respect to the pipe axis P in the direction in which the male threaded portion 51 is screwed, are each 90 degrees or more, and the condition α>β is satisfied. The same applies to the female threaded portion 21. That is, the stabbing flanks 33 of the female threaded portion 21 are angled by the same amount as the stabbing flanks 54 of the male threaded portion 51, and the load flanks 55 of the female threaded portion 21 are angled by the same amount as the load flanks 34 of the male threaded portion 51.

When machining the thus configured threads of the male threaded portion 51 and the female threaded portion 21, a tool that can be easily broken, with cutting edges that are wider at their tips and narrower at their roots, is not used. Thus, the efficiency of thread machining is improved and therefore the threaded joint 1 can be manufactured easily. Moreover, when a large tensile load is applied to the threaded joint 1, the movement of the pin 13 in the direction of the load is reliably restricted because the angle β of the load flanks is 90 degrees or more. Because of this, it is possible to prevent the occurrence of jump-out more reliably.

Most preferably, the angle α of the stabbing flanks and the angle β of the load flanks are each 90 degrees for the other advantages than ease of manufacturing to be fully produced. However, forming both the angle α and the angle β to be 90 degrees is not easy in manufacturing. Thus, it is preferred that the angle α of the stabbing flanks is in the range of 92 to 114 degrees. More preferably, the angle α of the stabbing flanks is in the range of 93 to 106 degrees. The angle β of the load flanks is set to 90 degrees or more because, if it is less than 90 degrees, jump-out may occur. However, if the angle β of the load flanks is too large, then the cutting edges of the tool need to be extremely sharp, and thus the tool life will be significantly decreased. Accordingly, the angle β of the load flanks is preferably in the range of 91 to 106 degrees on the premise that the condition α>β is satisfied. More preferably, the angle β of the load flanks is in the range of 92 to 101 degrees on the premise that the condition α>β satisfied.

Furthermore, each of the threads 57, 42 of the male threaded portion 51 and the female threaded portion 21 has a profile width that is larger at a base side than at a crest side. Because of this, thread machining for the threaded portions of the present embodiment is easy compared to thread machining for a threaded portion having a dovetail shape with the width being larger at a crest side than at a base side. This is because, in thread machining for the threaded portions of the present embodiment, a robust tool having cutting edges that are wider at their roots than at their tips can be used. Thus, the efficiency of thread machining is improved and therefore the threaded joint 1 can be manufactured easily.

As shown in FIG. 2, the seal surface 56 of the pin 13 and the seal surface 22 of the box 12 are mated and placed in intimate contact with each other in a state where the pin 13 and the box 12 have been made up. Because of the interference fit between the seal surfaces 56 and 22, they form seal portions by metal-to-metal contact and thereby exhibit sealing performance.

The nose portion 58 of the pin 13 extends from the leading end of the seal surface 56 of the pin 13 in the direction of the pipe axis P. The shoulder surface 59 is provided at the leading end of the nose portion 58. In a made-up state, the nose portion 58 is not in contact with the box 12, forming a clearance with the box 12. When a high compressive load is applied to the threaded joint 1, not only the regions of the shoulder surfaces 59, 24 that are in contact with each other plastically deforms, but also the nose portion 58, which serves as a buffer portion, plastically deforms. Thus, the degree of plastic deformation is reduced for each of the nose portion 58 itself and the regions of the shoulder surfaces 59, 24. As a result, the seal portions (seal surfaces 56, 22) adjacent to the nose portion 58 are prevented from plastically deforming, and therefore the sealing performance of the seal portions is ensured more stably.

The shoulder surface 59 of the pin 13 and the shoulder surface 24 of the box 12 are configured so that the angle formed by each of them with respect to the pipe axis P in the direction in which the male threaded portion 51 is screwed is less than 90 degrees. In the make-up of the pin 13 with the box 12, the shoulder surfaces 59, 24 are brought into contact with each other by the screwing of the pin 13 and serve as stoppers for restricting the screwing of the pin 13.

Preferably, the shoulder surfaces 59, 24 are disposed at locations such that locking and shouldering can occur simultaneously. However, it is difficult to cause locking and shouldering to occur exactly simultaneously. It is highly likely that either locking or shouldering occurs prior to the other.

Figure 5:
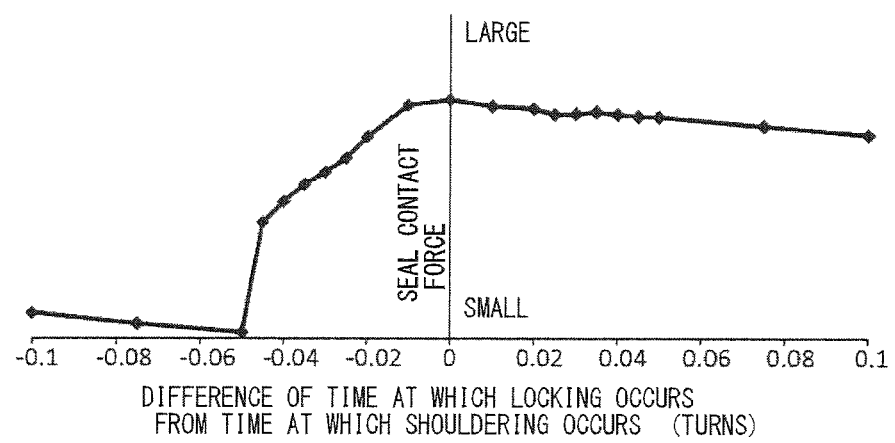
FIG. 5 is a diagram showing a change in seal contact force in association with the time difference between the occurrence of shouldering and the occurrence of locking.

FIG. 5 is a diagram showing a change in seal contact force in association with the time difference between the occurrence of shouldering and the occurrence of locking. Here, an investigation was made into the influence, caused by the time difference between the occurrence of shouldering and the occurrence of locking, on the contact force between the seal surfaces 22 and 56. In FIG. 5, the range of positive values, for indicating the difference of the time at which locking occurs from the time at which shouldering occurs, represents the case in which locking occurs subsequent to shouldering.

The results shown in FIG. 5 demonstrate that, when shouldering occurs prior to locking (in FIG. 5, in the range of positive values for indicating the difference of the time at which locking occurs from the time at which shouldering occurs), the contact force between the seal surfaces 22 and 56 is ensured. On the other hand, it is seen that, when locking occurs prior to shouldering (in FIG. 5, in the range of negative values for indicating the difference of the time at which locking occurs from the time at which shouldering occurs), sufficient seal contact force can be obtained provided that the time difference, in terms of the amount of relative rotation of the pin 13 with respect to the box 12, is less than a predetermined value (less than 0.050 turns as seen from FIG. 5).

Accordingly, the shoulder surfaces 59, 24 are preferably configured so that: the state in which the load flanks 55, 34 contact each other and the stabbing flanks 54, 33 also contact each other (locking) occurs when the amount of screwing rotation of the pin 13 with respect to the box 12 is within a predetermined range based on the time at which the shoulder surfaces 59, 24 are brought into contact with each other (the time of shouldering) in the make-up. Specifically, the configuration may be such that, in the case where locking occurs prior to shouldering, the locking occurs while the amount of screwing rotation of the pin 13 is smaller than that at the time of the occurrence of shouldering by less than 0.050 turns. In this case, more preferably, the locking may occur while the amount of rotation of the pin 13 is smaller than that at the time of the occurrence of shouldering by 0.045 turns or less. Alternatively, locking may occur subsequent to shouldering. Still more preferably, locking may occur simultaneously with shouldering.

Examples

To verify the advantages of the threaded joint of the present embodiment, numerical simulation and analysis was carried out using the elasto-plastic finite element method, and evaluations of torque resistance capability, galling resistance capability, and sealing ability were made. In addition, evaluation of threaded joint manufacturability was made by actually manufacturing experimental products.

Common features of the threaded joints (steel pipes and couplings) regarding the properties and sizes were as follows.

Steel pipe size: an outside diameter of about 169 mm and a wall thickness of about 9 mm (API standard, 6⅝ inch 24# pipe).

Steel Pipe Grade: API standard, L80 (a nominal tensile yield strength of 552 MPa (80 ksi)).

Female threaded portion and male threaded portion: a load flank pitch of 6.35 mm (four threads per inch), a thread height (load flank height) of 1.5 mm, a thread length of 100 mm, and an angle $\beta$ of the load flanks of 93 degrees.

Other factors were varied as shown in Table 1 below. Test Nos. 1 to 8 are inventive examples, which satisfy the conditions of the present embodiment. Test Nos. 9 to 11 are comparative examples, which do not satisfy the conditions of the present embodiment.

As shown in Table 1 below, the threaded joints of Inventive Examples Nos. 1 to 8 have threaded portions configured as shown in FIG. 3. The threaded joint of Comparative Example No. 9 has threaded portions having a trapezoidal profile such as one including API buttress threads. The threaded joint of No. 9 has: interference fits between the roots of the male threaded portion and the crests of the female threaded portion; clearances between the crests of the male threaded portion and the roots of the female threaded portion; and further, clearances between the stabbing flanks. The threaded joint of Comparative Example No. 10 has threaded portions having a trapezoidal profile. The threaded joint of No. 10 has interference fits between the load flanks and between the stabbing flanks, and has clearances between all the crests and roots of the male and female threaded portions. The threaded joint of Comparative Example No. 11 has threaded portions having a dovetail profile, in which the width is larger at a crest side than at a base side.

Figure 6:
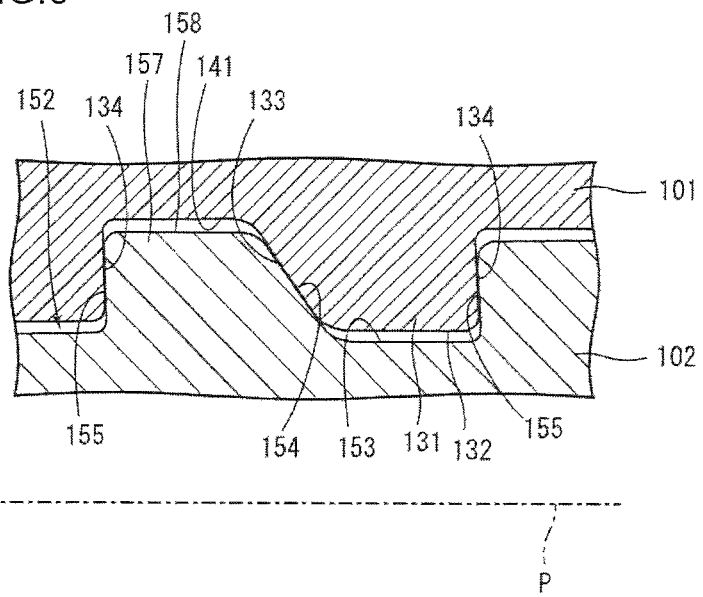
FIG. 6 is an enlarged longitudinal sectional view of a part of threaded portions of a threaded joint of Test No. 10, which is a comparative example.

FIG. 6 is an enlarged longitudinal sectional view of a part of the threaded portions of the threaded joint of Test No. 10, which is a comparative example. As shown in FIG. 6, in the threaded joint of Test No. 10, threads 131, which constitute a female threaded portion of a box 101, have a trapezoidal profile. Stabbing flanks 133 of the female threaded portion are sloping surfaces sloped at a predetermined angle with respect to the pipe axis P. The stabbing flanks 133 and load flanks 134 of the female threaded portion are in contact with stabbing flanks 154 and load flanks 155, respectively, of threads 157, which constitute a male threaded portion of a pin 102. The stabbing flanks 133 of the female threaded portion have an interference fit with the stabbing flanks 154 of the male threaded portion. In the meantime, clearances are provided between crests 132 of the female threaded portion and roots 153 of the male threaded portion as well as between roots 141 of the female threaded portion and the crests 158 of the male threaded portion. The reference numeral 152 in FIG. 6 indicates a groove of the male threaded portion of the pin 102.

Figure 7:
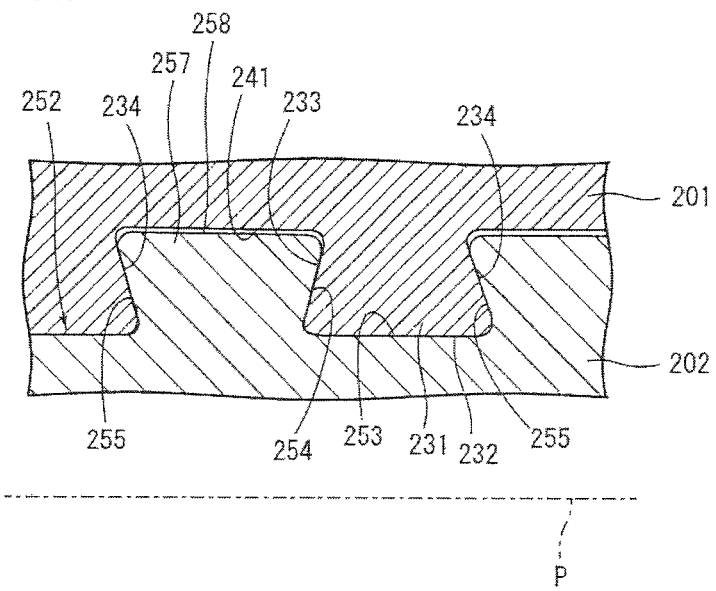
FIG. 7 is an enlarged longitudinal sectional view of a part of threaded portions of a threaded joint of Test No. 11, which is a comparative example.

FIG. 7 is an enlarged longitudinal sectional view of a part of the threaded portions of the threaded joint of Test No. 11, which is a comparative example. As shown in FIG. 7, in the threaded joint of Test No. 11, threads 231, which constitute a female threaded portion of a box 201, have a dovetail profile. Crests 232, stabbing flank 233, and load flanks 234 of the female threaded portion are in contact with roots 253, stabbing flanks 254, and load flanks 255 of a male threaded portion of a pin 202, respectively. In the meantime, clearances are provided between roots 241 of the female threaded portion and crests 258 of the male threaded portion. The reference numeral 252 in FIG. 7 indicates a groove of the male threaded portion of the pin 202.

Among the threaded joints of Test Nos. 1 to 11, all of them except the threaded joint of Test No. 11 have shoulder surfaces as shown in FIG. 2. That is, the threaded joint of Test No. 11 is configured such that the movement of its pin and box is completely restrained by locking of the threaded portions themselves, and therefore they are not provided with shoulder surfaces, which can hinder the locking.

TABLE 1

| Test Nos. | Angle of stabbing flanks ($\alpha$) | Radial interference fit of threaded portions (mm) | Thread form | Classification |
|---|---|---|---|---|
| 1 | 95 | 0.1 | FIG. 3 | Inventive Example |
| 2 | 100 | 0.1 | FIG. 3 | Inventive Example |
| 3 | 105 | 0.1 | FIG. 3 | Inventive Example |
| 4 | 110 | 0.1 | FIG. 3 | Inventive Example |
| 5 | 115 | 0.1 | FIG. 3 | Inventive Example |
| 6 | 120 | 0.1 | FIG. 3 | Inventive Example |
| 7 | 125 | 0.1 | FIG. 3 | Inventive Example |
| 8 | 130 | 0.1 | FIG. 3 | Inventive Example |
| 9 | 100 | 0.1 | Trapezoidal thread, Clearances between stabbing flanks | Comparative Example |
| 10 | 125 | 0.2 | Trapezoidal thread, Interference fit between stabbing flanks (FIG. 7) | Comparative Example |
| 11 | 85 | 0.1 | Dovetail profile (FIG. 8) | Comparative Example |

In the numerical simulation and analysis, models of the threaded joints of Test Nos. 1 to 11 were prepared, and for each of them, make-up of the pin and box was analyzed to calculate the shouldering torque (or torque at the time of locking), the overtorque, and the maximum contact pressure among contact pressures acting on the load flanks and the stabbing flanks of the threaded portions at the completion of the make-up (hereinafter referred to as the "maximum flank contact pressure"). Evaluations of high shouldering were made using the shouldering torques, and evaluations of torque resistance capability were made using the overtorques. Evaluations of the risk of galling at threaded portions were made using the maximum flank contact pressures.

Furthermore, analysis by simulating a series A test specified in ISO standard 13679: 2002, which is a test specification for threaded joints, was carried out, and the minimum value of the seal surface contact force was determined. By means of this, the sealing capabilities of the threaded joints were evaluated.

Furthermore, the threaded joints of Test Nos. 2, 9, and 11 were actually manufactured, and the threaded joint manufacturability was evaluated.

Table 2 below shows the results of the numerical simulation and analysis. In Table 2, the values of the shouldering torque, overtorque, minimum seal surface contact force, and maximum flank contact pressure are relative values based on calculated values of the threaded joint of No. 9 as being the reference "1.0".

TABLE 2

| Test Nos. | Shouldering Torque | Over-torque | Minimum seal surface contact force | Maximum flank contact pressure |
|---|---|---|---|---|
| 1 | 1.5 | 2.0 | 1.6 | 4.9 |
| 2 | 1.2 | 2.0 | 1.5 | 5.0 |
| 3 | 1.3 | 1.9 | 1.3 | 4.4 |
| 4 | 1.3 | 1.5 | 1.1 | 4.3 |
| 5 | 1.2 | 1.3 | 0.9 | 4.2 |
| 6 | 1.2 | 1.2 | 0.7 | 4.4 |
| 7 | 1.3 | 1.1 | 0.5 | 4.3 |
| 8 | 1.2 | 1.1 | 0.1 | 4.4 |
| 9 | 1.0 | 1.0 | 1.0 | 1.0 |
| 10 | 5.0 | 1.8 | 1.0 | 10.4 |
| 11 | 1.3 | 2.1 | 1.3 | 5.3 |

In Table 2, the values of the shouldering torque mean that the larger they are, the higher the risk of high shouldering. Table 2 indicates that the threaded joint of Comparative Example No. 10 has a high risk of high shouldering. On the other hand, the threaded joints of Inventive Examples Nos. 1 to 8 have shouldering torques comparable to those of the threaded joints of Comparative Examples Nos. 9 and 11 and have a lower risk of high shouldering than that of the threaded joint of Comparative Example No. 10.

In Table 2, the values of the overtorque mean that the larger they are, the better the torque resistance capability. As shown in Table 2, the threaded joints of Inventive Examples Nos. 1 to 8 have greater overtorques than that of the threaded joint of Comparative Example No. 9. In particular, the overtorques of the threaded joints of Inventive Examples Nos. 1 to 3 are comparable to those of Comparative Examples Nos. 10 and 11.

In Table 2, the values of the maximum flank contact pressure mean that the larger they are, the higher the risk of galling during the process of make-up. As shown in Table 2, the risks of galling of the threaded joints of Inventive Examples Nos. 1 to 8 are much lower than that of the threaded joint of Comparative Example No. 10 and are comparable to that of the threaded joint of Comparative Example No. 11.

In Table 2, the values of the minimum seal surface contact force mean that the larger they are, the better the sealing ability. As shown in Table 2, the sealing capabilities of the threaded joints of Inventive Examples Nos. 1 to 4 are comparable to or better than those of the threaded joints of Comparative Examples Nos. 9 to 11. In particular, the sealing capabilities of the threaded joints of Inventive Examples Nos. 1 to 3 are comparable to or better than that of the threaded joint of No. 11, and thus it is seen that they have even better sealing capabilities.

Table 3 below shows the results of evaluating the threaded joint manufacturability. In Table 3, the thread machining times for the actually manufactured threaded joints of Test Nos. 2, 9, and 11 are indicated as follows: the shortest thread machining time, i.e., the thread machining time for the threaded joint of Test No. 9, is assumed to be "1.0", and the thread machining times for the other threaded joints are relative values based thereon. In addition, in Table 3, the tool lives for the actually manufactured threaded joints are indicated as follows: the shortest tool life, i.e., the tool life for the threaded joint of Test No. 11, is assumed to be "1", and the tool lives for the other threaded joints are relative values based thereon.

TABLE 3

| Test Nos. | Thread machining tune | Tool life |
|---|---|---|
| 2 | 1.3 | 15 |
| 9 | 1.0 | 30 |
| 11 | 2.5 | 1 |

As shown in Table 3, the thread machining time for the threaded joint of Inventive Example No. 2 is about half the thread machining time for the threaded joint of No. 11, which has threaded portions having a dovetail profile, and is closed to the thread machining time for the threaded joint of No. 9, which has trapezoidal threads. The tool life for the threaded joint of Inventive Example No. 2 is not as long as the tool life for the threaded joint of No. 9, but is much longer than the tool life for the threaded joint of No. 11.

As described above, the threaded joint 1 for steel pipes of the present embodiment is configured as follows. In the direction in which the male threaded portion 51 is screwed, the width of the threads 57 of the male threaded portion 51 gradually decreases along the thread helix, whereas the width of the grooves 62 thereof gradually increases along the thread helix; and the width of the grooves 42 of the female threaded portion 21 gradually decreases along the thread helix, whereas the width of the threads 31 thereof gradually increases along the thread helix.

Accordingly, when the male threaded portion 51 and the female threaded portion 21 come into locking engagement in the course of screwing the pin 13 onto the box 12, a wedge effect is produced by the contact between the load flanks 55 and 34 and the contact between the stabbing flanks 54 and 33, and as a result, the tightening torque rapidly increases. Thus, it is possible to increase the amount of torque required to cause plastic deformation in the regions of the shoulder surfaces 59, 24 after shouldering. Consequently, it is possible to improve the torque resistance capability of the threaded joint 1. Also, by employing the above-described configurations of the male threaded portion 51 and the female threaded portion 21, it is possible to prevent the occurrence of high shouldering and, since high dimensional accuracy of the threaded portion is no longer necessary, it is possible to increase the manufacturability of the threaded joint 1.

The threaded joint 1 for steel pipes of the present embodiment is configured such that, in the course of screwing the pin 13 onto the box 12, the crests 32 of the female threaded portion 21 and the roots 61 of the male threaded portion 51 come into contact with each other before the seal surface 22 of the box 12 and the seal surface 56 of the pin 13 are brought into contact with each other. It is to be noted that the crests 32 of the female threaded portion 21 and the roots 61 of the male threaded portion 51 are configured such that they begin contacting each other before the seal surfaces 22, 56 are brought into contact with each other so as to have a predetermined interference fit when the make-up of the pin 13 with the box 12 has been completed.

As stated above, the contact between the load flanks 55 and 34 and between the stabbing flanks 54 and 33 produces a wedge effect to bring them into very hard contact with each other. However, in the process before this occurs, only the stabbing flank 54 and 33 are in contact with each other with merely such a degree of contact that can be imparted by the weight of the steel pipe 2 (box 12). Because of this, the risk of galling at the threaded portions can be reduced. Moreover, the seal surfaces 22 and 26 are brought into contact with each other after the crests 32 of the female threaded portion 21 and the roots 61 of the male threaded portion 51 have come into contact with each other. Because of this, the box 12 and the pin 13 can be placed in concentric relationship in the course of screwing the pin 13 onto the box 12. As a result, it is possible to prevent galling that may be caused by partial contact between the seal surfaces 22 and 26 when the seal surfaces 22 and 26 are brought into contact with each other.

It is noted that the crests 32 of the female threaded portion 21 and the roots 61 of the male threaded portion 51 may be parallel to the pipe axis P or inclined with respect to the pipe axis P. Furthermore, the sectional shapes of the crests 32 of the female threaded portion 21 and the roots 61 of the male threaded portion 51 may not be formed by exact straight lines, but may be formed by curved lines having a curvature or by a combination of a straight line and a curved line.

Preferably, the rate of change in the width of the threads 57 of the male threaded portion 51 may be adjusted appropriately according to the outside diameter of the threaded joint 1 and the length of the male threaded portion 51. However, when the rate of change in the width of the threads 57 is to be large, repeated reciprocation of a thread machining tool is necessary in machining the threads 57, and therefore the efficiency of thread machining is reduced, resulting in an increase in manufacturing costs. Thus, in consideration of manufacturability, the rate of change in the width of the threads 57 of the male threaded portion 51 is preferably within a factor of 3, and more preferably within a factor of 2 based on comparison of the width of the threads 57 between the opposite ends of the helix.

The greater the thread heights of the male threaded portion 51 and the female threaded portion 21, or, the smaller the thread pitches of the male threaded portion 51 and the female threaded portion 21, the further the torque resistance capability of the threaded joint 1 is improved. However, in this case, shear stiffness of the male threaded portion 51 and the female threaded portion 21 will decrease. In such a case, a tool having cutting edges that are narrow and elongated needs to be used, and therefore it is more likely that breakage, failure, or, the like of the tool occurs. In order to avoid these problems, the thread heights and the thread pitches may be set so that the narrowest widths of the grooves 62 of the male threaded portion 51 and the grooves 42 of the female threaded portion 21 are each greater than 0.7 times the height of each thread height.

The shoulder surface 24 of the box 12 and the shoulder surface 59 of the pin 13 are configured so that locking and shouldering can occur simultaneously. By virtue of this, high torque resistance capability can be obtained, and a predetermined interference fit is provided between the seal surfaces 22 and 56, so that sealing ability as designed is obtained.

When the difference of the time at which locking occurs from the reference time at which shouldering occurs is within a range of ±0.150 turns in terms of the amount of screwing rotation of the pin 13 onto the box 12, the torque resistance capability can be improved. In order to obtain further improved torque resistance capability, the amount of rotation is more preferably within ±0.080 turns. In order to further ensure sufficient seal contact force, the amount of rotation on the negative side, i.e., the amount of rotation from the time at which preceding locking occurs to the time at which subsequent shouldering occurs, is preferably as small as possible. Accordingly, in order to stably obtain both high sealing ability and high torque resistance capability, the amount of rotation is preferably within a range of +0.150 turns to less than −0.050 turns, and more preferably within a range of +0.080 turns to −0.045 turns.

Figure 8A:
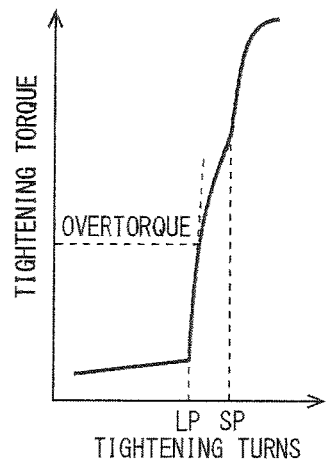
FIG. 8A is a schematic illustration showing an example of a relationship between the number of pin tightening turns and the tightening torque, illustrating a situation in which locking occurs prior to shouldering.
Figure 8B:
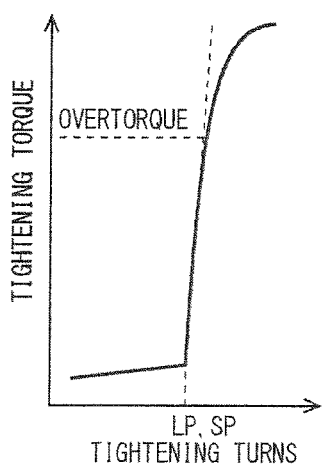
FIG. 8B is a schematic illustration showing an example of a relationship between the number of pin tightening turns and the tightening torque, illustrating a situation in which locking occurs almost simultaneously with shouldering.
Figure 8C:
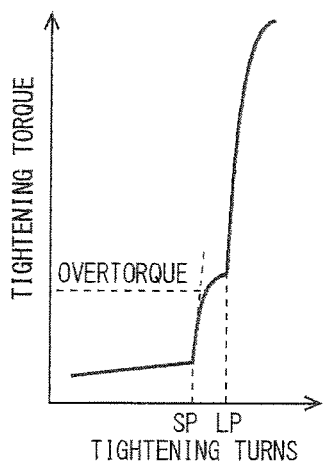
FIG. 8C is a schematic illustration showing an example of a relationship between the number of pin tightening turns and the tightening torque, illustrating a situation in which locking occurs subsequent to shouldering.

FIGS. 8A to 8C are schematic illustrations each showing an example of a relationship between the number of pin tightening turns and the tightening torque, in make-up of the pin with the box. FIGS. 8A to 8C are what is referred to as a torque chart. FIG. 8A illustrates a situation in which locking occurs prior to shouldering. FIG. 8B illustrates a situation in which locking occurs almost simultaneously with shouldering. FIG. 8C illustrates a situation in which locking occurs subsequent to shouldering. In FIGS. 8A to 8C, "LP" refers to the time at which locking occurs, and "SP" refers to the time at which shouldering occurs.

Whether the difference of the time at which locking occurs from the reference time at which shouldering occurs is within the predetermined range (+0.150 turns to less than −0.050 turns) in terms of the amount of screwing rotation of the pin can be determined in the following manner. Before carrying out make-up, thread positions of the male threaded portion of the pin and of the female threaded portion of the box are measured, and based on this, the torque chart recorded during the make-up is examined.

Specifically, first, for the pin, an arbitrary thread in the male threaded portion is selected, and the axial distance X from the selected thread to the shoulder surface is measured. For the box, a groove, among the grooves of the female threaded portion, having the same width as that of the thread selected for the measurement of the pin is selected, and the axial distance Y from the selected groove to the shoulder surface is measured. The difference A between the distance X and the distance Y is calculated. Then, the value A/P is calculated, where P is the thread pitch between the load flanks of the male threaded portion or the female threaded portion. Theoretically, the A/P is the difference of the time at which locking occurs from the reference time at which shouldering occurs, i.e., in terms of the amount of screwing rotation of the pin.

It is to be noted that, in reality, variations occur in the thread lead within the manufacturing tolerance, or slight variations occur in the thread lead as a result of a surface treatment applied to the surfaces of the pin, box, or the like. Thus, a more exact A/P is determined by adding or subtracting the difference caused by the variations in the thread lead to or from the A/P calculated in the above manner. Based on this, the pin and box, for which the above measurement has been carried out, are actually made up, and the line of the torque chart obtained during the make-up is examined.

For example, as shown in FIG. 8B, when the difference of the time at which locking occurs from the reference time is within a predetermined range, almost no steps are observed in the rising part of the line (referred to as delta torque), indicating that the overtorque, which represents torque resistance capability, is very high. If the difference of the time at which locking occurs from the reference time is outside the predetermined range, steps appear in the delta torque as shown in FIG. 8A or FIG. 8C. Normally, the torque at the time at which a step (portion offset from the straight line) first appears in the delta torque is regarded as the overtorque. Thus, when the difference of the time at which locking occurs from the reference time is outside a predetermined range, it is impossible to obtain high torque resistance capability.

Other Embodiments

While in the foregoing, an embodiment of the present invention has been described, it is to be understood that the above embodiment is merely an illustrative example by which the present invention is implemented. Thus, the present invention is not limited to the above embodiment, and modifications of the above embodiment may be made appropriately without departing from the spirit and scope of the invention.

In the above embodiment, in the make-up of the coupling 11 and the steel pipe 2, they are positioned in an orientation such that the pipe axis P extends vertically. However, the coupling 11 and the steel pipe 2 may be positioned in any orientation during make-up as long as the make-up between them can be carried out.

In the above embodiment, the seal surface 22 of the box 12 is located between the female threaded portion 21 and the shoulder surface 24, and the seal surface 56 of the pin 13 is located between the male threaded portion 51 and the shoulder surface 59. The seal surfaces and the shoulder surfaces are located adjacent to each other, and the pin has a nose portion in the end portion thereof. However, the threaded joint 1 of the present embodiment may be combined with any other seal structure. The threaded joint 1 of the present embodiment does not suffer substantial damage at the seal surfaces, the shoulder surfaces and the nose portion even when repeated loads are applied. Consequently, it is possible to obtain more stable sealing ability than that of conventional threaded joints for steel pipes.

The above embodiment of a threaded joint is applicable not only to a coupling-type threaded joint but also to an integral-type threaded joint.

INDUSTRIAL APPLICABILITY

A threaded joint for steel pipes according to the present invention can be utilized as a threaded joint for connecting steel pipes.

REFERENCE SIGNS LIST

1: threaded joint for steel pipes, 2: steel pipe, 11: coupling, 12: box, 13: pin,
21: female threaded portion, 22: seal surface of box,
24: shoulder surface of box,
31: thread of female threaded portion, 32: crest of female threaded portion,
33: stabbing flank of female threaded portion, 34: load flank of female threaded portion,
41: root of female threaded portion, 42: groove of female threaded portion,
51: male threaded portion,
52: crest of male threaded portion,
54: stabbing flank of male threaded portion,
55: load flank of male threaded portion, 56: seal surface of pin,
57: thread of male threaded portion, 58: nose portion,
59: shoulder surface of pin, 61: root of male threaded portion,
62: groove of male threaded portion, P: pipe axis,
α: angle formed by stabbing flank of male threaded portion with respect to pipe axis,
β: angle formed by load flank of male threaded portion with respect to pipe axis

The invention claimed is:

1. A threaded joint for steel pipes, comprising a tubular pin and a tubular box, the pin and the box being made up by screwing the pin onto the box,
   the pin including a shoulder surface, a seal surface, and a male threaded portion;
   the box including a shoulder surface, a seal surface, and a female threaded portion, corresponding to the shoulder surface of the pin, the seal surface thereof, and the male threaded portion thereof, respectively;
   the male threaded portion and the female threaded portion each being a tapered threaded portion including threads having a trapezoidal profile, each thread of the male threaded portion and the female threaded portion having a profile width that is larger at a base side than at a crest side,
   wherein:
   the male threaded portion has a thread width that gradually decreases along a thread helix thereof and a groove width that gradually increases along the thread helix, in a screwing direction in which the pin moves with respect to the box and the male threaded portion is screwed; and the female threaded portion has a groove width that gradually decreases along a thread helix thereof and a thread width that gradually increases along the thread helix, in the screwing direction,
   in a made-up state, the shoulder surfaces are in contact with each other, the seal surfaces are in contact with each other, load flanks of the male threaded portion are in contact with load flanks of the female threaded portion, stabbing flanks of the male threaded portion are in contact with stabbing flanks of the female threaded portion, roots of the male threaded portion are in contact with crests of the female threaded portion, and clearances are provided between crests of the male threaded portion and roots of the female threaded portion, the roots of the male threaded portion and the crests of the female threaded portion configured to have an interference fit in the radial direction of the pin and the box so that in the course of screwing the pin onto the box, the roots of the male threaded portion and the crests of the female threaded portion begin contacting each other before the seal surfaces begin contacting each other, and
   the stabbing flanks of the male threaded portion form an angle α with respect to a pipe axis at a leading side in the screwing direction and the load flanks of the male threaded portion form an angle β with respect to the pipe axis at a leading side in the screwing direction, wherein the angle α and the angle β are each 90 degrees or more, and the condition α>β is satisfied.

2. The threaded joint for steel pipes according to claim 1, wherein:
   the shoulder surfaces are configured so that, in the make-up of the threaded joint, a state in which the load flanks contact each other and the stabbing flanks also contact each other occurs when an amount of screwing rotation of the pin with respect to the box is within a predetermined range, based on a time at which the shoulder surfaces are brought into contact with each other.

3. The threaded joint for steel pipes according to claim 1, wherein:
   the seal surface of the pin is disposed between the male threaded portion of the pin and the shoulder surface thereof.

4. The threaded joint for steel pipes according to claim 3, wherein:
   the shoulder surface is disposed at an end of the pin, the pin having a nose portion between the seal surface and the shoulder surface.

* * * * *